United States Patent Office 3,238,063
Patented Mar. 1, 1966

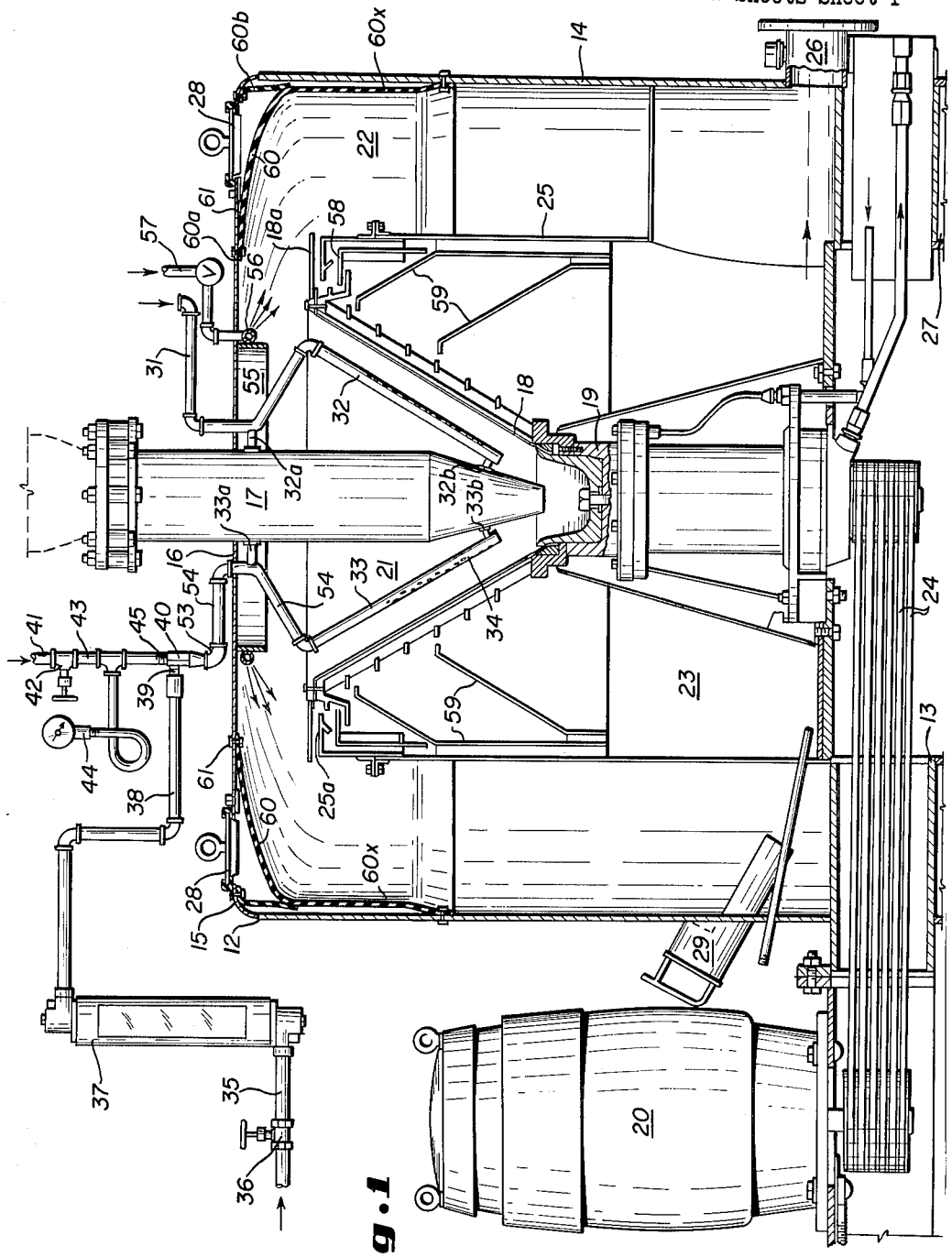

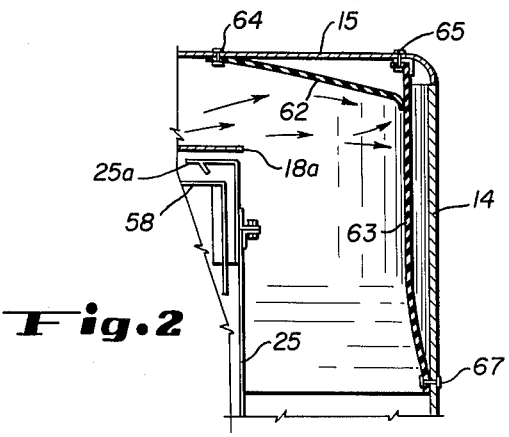
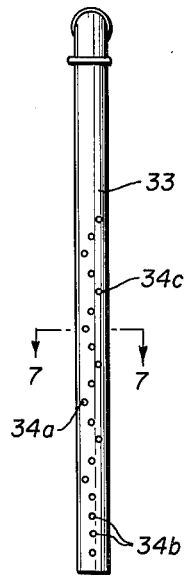
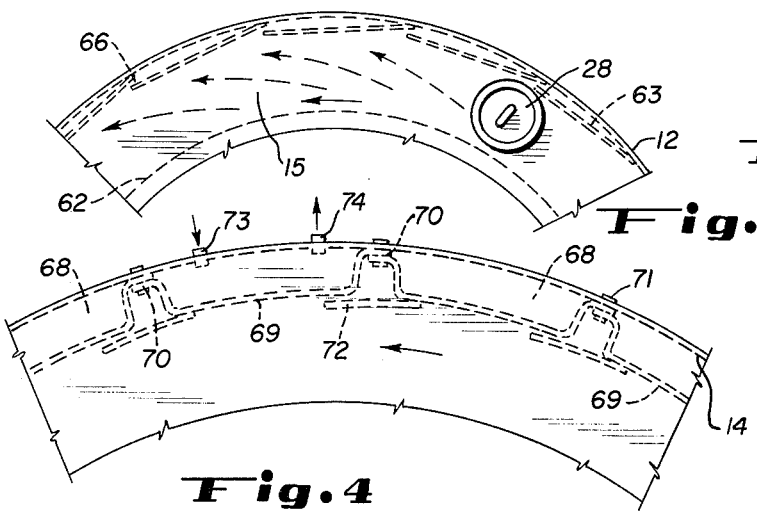
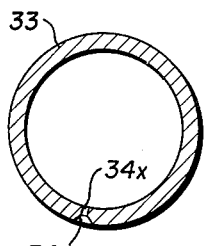
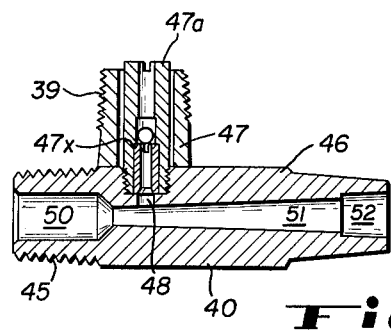
INVENTOR.
Clarence R. Steele

3,238,063
CONTINUOUS CENTRIFUGAL APPARATUS AND METHOD OF CONTINUOUSLY SEPARATING GRANULAR CRYSTALS THEREWITH
Clarence R. Steele, Denver, Colo., assignor to American Factors Associates, Limited, Honolulu, Hawaii, a corporation of Delaware
Filed Aug. 3, 1962, Ser. No. 214,760
8 Claims. (Cl. 127—19)

This invention relates to a method and apparatus for continuous centrifugal treatment of massecuite and similar solutions.

In particular, this application is directed to improvements in the apparatus and methods disclosed in the copending application of Clarence R. Steele and Frank B. Price, Serial Number 143,892, filed October 9, 1961, for Continuous Centrifugal Apparatus, and assigned to the assignee of this application. The continuous centrifugal as disclosed in said application was believed to produce a considerable amount of fine grain sizes due to its high speed discharge of the separated sugar crystals across the rim of the basket, and consequently was used primarily in stages of the sugar refining process where the sugar was to be remelted.

It was assumed that the discharging sugar grains were reduced by impact and attrition in the discharge action. However, further observation of actual operations disclosed that such conclusion was erroneous as only a minor amount of fine grains was produced in such action. In order to provide prompt and efficient screen penetration by the separated and separating liquid or solution, a mixture of steam and water was being introduced into the interior of the basket to dilute and remove molasses adhering to the grains. This mixture was required to penetrate rapidly into the revolving mass of crystals and solution and was discharged so as to atomize the liquid droplets for effective distribution within and penetration through the revolving mass.

After solution removal as aforesaid, a small amount of liquid adhered to the separated grains and while the granular discharge was essentially dry, it contained enough moisture to cause a build-up of lumps or chunks on the outer wall of the sugar discharge passage in the line of discharge flight, and the continuing bombardment of such lumps or chunks eroded the adhering mass and produced most of the fine grains therefrom.

Another problem encountered in the earlier operations involved the water-steam mixing and introduction into the centrifugal interior through a common spray nozzle or manifold. In order to provide the desired rate of penetration, a number of minute openings were formed in the manifold and in operation these openings tended to clog, causing erratic liquid distribution and cleaning difficulties.

In some sugar refining operations, the separated sugar discharge from the centrifugal is introduced into a substantially saturated sugar solution utilized as a conveying media so that the formed grains will not be dissolved while they are conducted to another stage of the operation. In other treatments, the separated sugar grains will be dissolved and moved as a true solution to a next stage in the plant. As a result of the aforementioned studies of said centrifugal performance it was decided to attempt mixing of sugar grains and saturated or unsaturated solution in conjunction with the sugar grain discharge from the basket. It was determined that excellent solids to liquid contact can be obtained in this way without alteration of grain size or to completely dissolve the sugar grains and the final sugar discharge from the centrifugal passes through the conduits or lines in a freely moving flow.

Accordingly, it is an object of this invention to provide a simple, durable and efficient continuous centrifugal apparatus having a control of solids discharge which substantially eliminates or avoids reduction in size of formed grains.

Another object of my invention is to provide a simple, economical and efficient continuous centrifugal separation of granular solids from associated solution in which separated grains are mixed with a liquid carrier without alteration of grain size as a part of the separation action for subsequent flow to a following stage of the treatment.

Yet another object of my invention is to provide a simple, economical and efficient continuous centrifugal separation of granular solids from associated solution in which separated grains are mixed with a solvent liquid carrier as a part of the separation action for subsequent flow to a following stage of the treatment.

A further object of my invention is to provide a novel type of granular product discharge passage in a continuous centrifugal apparatus which effects a direct discharge of the grains without appreciable reduction in grain size.

Still another object of my invention is to provide a novel type of control of continuous centrifugal separations in which extraneous liquid input is balanced to density of material in the separation zone so as to maintain predetermined standards of grain size and moisture content in the separated granular product.

Other objects reside in novel details of construction and novel combinations and arrangements of parts, all of which will be explained in the course of the following description.

The practice of this invention will now be described with reference to the accompanying drawings. In the drawings in the several views of which like parts bear similar reference numerals:

FIG. 1 is a vertical section through a continuous centrifugal apparatus embodying features of the present invention;

FIG. 2 is a fragmentary section similar to FIG. 1, and showing another form of baffle assembly in the granular discharge zone;

FIG. 3 is a fragmentary top plan view of the baffle installation shown in FIG. 2;

FIG. 4 is another fragmentary top plan view of still another baffle installation for the granular zone;

FIG. 5 is a front elevation of the water-steam manifold shown in FIG. 1;

FIG. 6 is a vertical section through the aspirating mixer installed in the water-steam supply line of the apparatus shown in FIG. 1; and FIG. 7 is an enlarged section, taken along the line 7—7, FIG. 5.

As shown in FIG. 1, the continuous centrifugal apparatus of my invention comprises an outer housing portion 12, including a base structure 13 adapted for support on a suitable foundation or floor (not shown), an upright cylindrical wall portion 14, and a top cover portion 15, inclusive of a central removable portion 16 having a tubular feed inlet 17 extending into the interior of the casing or housing for delivery of material to be treated into the bottom of a centrifugal basket 18 supported on a spindle 19 for high speed rotation about a vertical axis.

The interior of the housing 12 is divided into an upper central treatment zone 21 in which the feed is introduced, an outer annular discharge zone 22 for granular sugar discharge, and a lower interior zone 23 for discharge of spent solution. The lower enclosed portion of the housing 12 also contains a transmission system 24 for driving spindle 19 by a prime mover, such as an electric motor 20. An upright partition member 25 separates the discharge zones 22 and 23 and has its top portion 25$^a$ extending in close proximity to the top or lip 18ᵃ of the basket 18 so as to confine all liquid penetrating the openings in the basket 18 and direct its flow through interior zone 23 to its final point of discharge from the apparatus through the outlet passage 26. The granular discharge is through a lower outlet 27.

In its general arrangement the continuous centrifugal apparatus of this invention is similar to the apparatus shown and described in Steele et al. Ser. No. 143,892, particularly as to housing details, basket construction, spindle drive and spindle lubrication, and features described but not claimed herein have been claimed in said copending application. However, it should be understood that the features of improvement to which this invention is directed may be utilized with other types and shapes of centrifugal baskets, lubricated in any suitable manner and enclosed in other housing structure.

Access to the interior of discharge zone 22 for inspection, cleaning or repair is permitted by removal of plug members 28 and sugar samples may be removed through the chambers 29 in the lower portion of upright wall 14. During operation, all openings remain closed except as sugar samples are taken.

In order to promote liquid discharge through the openings of basket 18, steam is supplied from a suitable source (not shown) through a valve-controlled line 31 feeding a distributor manifold 32 having outlets ranging throughout substantially the vertical extent of basket 18 so as to warm the circulating material being treated and render it more fluid. Manifold 32 is disposed substantially parallel and in proximity to the inner surface of basket 18 and receives stabilizing support for feed inlet 17 by connections at 32ᵃ and 32ᵇ. A water-steam manifold 33 of a novel character and operation is located at approximately 180° from manifold 32 and also is disposed substantially parallel and in proximity to the inner surface of basket 18. It also receives stabilizing support to feed inlet 17 by connections at 33ᵃ and 33ᵇ. As shown in FIG. 5, manifold 33 has a series of outlets 34 facing the basket and arranged in a staggered pattern to provide a wider spray pattern to the fog or mist discharge from the manifold.

In the preferred arrangement shown in FIG. 5, a total of nineteen openings are provided and arranged in three rows 34ᵃ, 34ᵇ and 34ᶜ with eleven openings in intermediate row 34ᵇ and four openings in the outside rows 34ᵃ and 34ᶜ. The lower end of manifold 33 is disposed near the bottom of the screening surface and the lowermost opening is adjacent thereto. The openings are located at uniformly spaced intervals lengthwise of manifold 33 to provide a sinuous discharge pattern and the uppermost opening is disposed substantially below the top screening surface of basket 18 as most of the liquid content of the feed has been separated and discharged at such elevation. The number of such openings may be varied in accordance with the size and requirements of the centrifugal apparatus in which the manifold is to be installed.

In order to prevent clogging and to facilitate cleaning of the manifold outlets they are drilled with a small diameter passage on the inside and a concentric countersink to the outside, as shown in FIG. 7. The small diameter inner portion 34ˣ of the passage is of very short length and when foreign matter lodges therein it is easily removed by the pressure of the fluid in manifold 33. The external countersunk area 34ᶻ is of much larger diameter and its tapering contour tends to eject or drain any material deposited in the outer portion of the passage as well as spreading the discharging fluid. It was found that by using this passage arrangement with steam and water mixing in the supply thereto, larger openings could be utilized without lessening the desired atomization, and clogging of the passages was substantially eliminated.

The moisture content and velocity of the spray or mist discharge is closely controlled and preferably the control may be automatic between manual settings of the control instruments. The supply and control arrangement shown in FIG. 1 comprises a water supply line 35 connected to a suitable source of supply (not shown) and having a manual shut-off valve 36 which is open during operation. A flow indicator 37 shows the volume of flow to permit regulation of valve 36 for maintaining the selected rate of flow through a branch line 38 connected to the aspirating mixer 40 at 39.

Steam from a boiler or other source of supply (not shown) is delivered through a line 41 having a manual shutoff valve 42 and passes into a branch line 43 having a pressure gauge 44 connected thereto for indicating the discharge flow through the branch line 43 which is connected to mixer 40 as shown at 45. Flow indicator 37, pressure gauge 44 and mixer 40 are standard commercial equipment and per se, are not part of this invention and any equivalent unit will be satisfactory in the practice of this invention. For this reason, only mixer 40 has been shown in detail for explanation of the type of mixing action required in the practice of the invention.

As shown in FIG. 6, the mixer comprises an elongated body portion 46 and a lateral extension portion 47. The portion 46 is externally threaded at one end to provide the connection 45 with branch 43 of the steam supply and the nipple or extension portion 47 also is externally threaded for the connection 39 with branch line 38 of the water supply circuit. A valving arrangement 47ᵃ inclusive of a check valve 47ˣ is disposed interiorly of nipple 47 and passes the flow of water into the hollow interior bore of body portion 46 through an entrance passage 48.

The passage through body portion 46 is of varying width and comprises a generally cylindrical entrance portion 50 tapering to a reduced passage 51 into which the entrance passage 48 extends, and passage 51 is of progressively enlarging diameter in a downstream direction and terminates in a wider outlet passage 52. All of the bore-forming portions are in concentric arrangement and this arrangement provides a venturi or aspirating effect by which the water droplets entering the bore of body portion 46 are entrained in the following steam and are atomized and suspended therein. This mist discharges into a reducer unit 53 from which it passes into the branch line 54 feeding manifold 33 and discharges through the openings 34 therein.

In order to provide the novel liquid-solids mixing in conjunction with the granular discharge action, an annular manifold 56 is supported on an annular splash guard 55 secured on and depending from the inner surface of top cover portion 15. The normal function of splash guard 55 is to prevent escape of discharging crystals at any time the cover is removed while the centrifugal is running. The annular manifold 56 is disposed above and slightly inwardly of a vertical plane extending from the top of basket 18. Annular manifold 56 has openings directed toward the basket overflow. The manifold 56 receives solution from a valve-controlled line 57, which is connected with a suitable source of solution supply (not shown). In addition to the solution mixing which will be described in detail hereinafter, line 57 may be utilized by selective valve operation to supply a wash solution such as hot water for cleaning operations.

In the arrangement shown in FIG. 1, a baffle assembly 58 is provided directly under rim 18ᵃ of the centrifugal basket 18, and distributor baffles 59 are supported from partition 25. All of these features are shown and described in said copending application Serial No. 143,892 and detailed description of same appears unnecessary.

The baffle arrangement shown in FIG. 1 includes a cup-shaped body 60 of elastic or flexible material, such as rubber, having a smooth surface facing inwardly of the housing and bolted or otherwise secured to the housing at its upper end 60ᵃ as shown at 61. A flap portion 60ᵇ also is provided for attachment to the housing to give suspending support to the depending peripheral portion 60ˣ of body 60. If desired the lower rim of peripheral portion 60ˣ may be secured to housing wall 14 as by bolting. Due to its shape, suspension and elasticity, the force of the discharge material directed against body 60 produces a pulsating or undulating movement of the contact surfaces which resist adherence of particles and direct the granular discharge to the bottom of zone 22. When the discharge impact action provides sufficient pulsation in the depending portion of body 60 to prevent crystal adherence to its surface, the lower fastening of rim 60$^x$ will not be required.

Modified forms of baffles are shown in FIGS. 2, 3, and 4. The arrangement shown in FIGS. 2 and 3 will be described as installed in the centrifugal separator shown in FIG. 1 and parts of the basket, baffle assembly and housing shown bear the same reference numerals as in FIG. 1. The elastic baffle assembly shown comprises a sectional arrangement inclusive of a top annular section 62 and a plurality of outer depending sections 63 arranged as a circumferential wall or enclosure. The annular section 62 is held to the top cover section 15 of the housing assembly adjacent its inner edge in any suitable manner, such as by bolts 64, and its outer peripheral edge is not secured but is suspended in engagement with the exposed surfaces of the sections 63. The sections 63 may be secured at their upper ends in any suitable manner, such as by bolts 65. These sections are disposed in lapping arrangement as shown at 66 in FIG. 3 so as to prevent penetration by the granular discharge, the direction of which is indicated by the dash line arrows in FIG. 3.

The action of the granular discharge usually provides sufficient pulsation to the sections 63 to keep the exposed surface clean and prevent any build-up of material thereon. However, it may be desirable in some treatments to fasten the lower ends of the sections to wall 14 by bolting as shown at 67 in FIG. 2. By so doing an air cushion effect is attained and the exposed surface is maintained in an undulating movement which directs the solids discharge to the lower portion of chamber or zone 22.

Still another baffle arrangement is shown in FIG. 4, in which a series of air-confining chambers 68 are formed as a circumferential cover on the inner surface of upright wall 14 by sections 69 of elastic or flexible material such as a sheet of rubber or similar material. These sections are shaped as a channel or U-section and their flanged edges 70 are lapped and suitably secured to wall 14 as by bolts 71. A strip or flap 72 is secured on the trailing side of each section, in reference to the direction of centrifugal rotation, and covers the gap between adjoining sections. Each chamber in effect is a pneumatic cushion and has a valved inlet 73 and outlet 74 for connection with a pneumatic pump or the like which directs pulsating forces against the flexible surfaces of each chamber 68.

The continuous centrifugal apparatus shown in FIG. 1 will be described with reference to the treatment in a sugar refinery in which a syrup of massecuite containing sugar crystal grains is introduced as the feed material for a liquid-solids separation. An optimum condition for many separations is to affect the separation without any appreciable reduction in the size of the grains and also to have the final granular discharge in an essentially dry condition. Industrial requirements may place a limit on moisture content of the granular discharge and also may place a standard on grain sizes which limits the amount of fine sizes that are acceptable in the product. The apparatus illustrated in FIG. 1 is well suited to satisfy these industrial requirements.

In operation, the solution containing the crystal gains is delivered through the inlet tube 17 to the interior of the basket 18 mounted on spindle 19 by which it is rotated at high speed. The treatment is continuous and the feed through tube 17 is continuous with solids discharge across the lip 18$^a$ of basket 18 and liquid ejection through the apertures in the screening surface of basket 18.

The feed to basket 18 is rather dense and because of its high speed rotation, it is not easily penetrated by wash liquid. Unless the sugar grains are washed before and during separation, some associated molasses will adhere thereto and pass from the treatment with the granular discharge across rim 18$a$. The provision of a mixture of steam and water in a finely atomized condition, such as delivered by aspirating mixer 40 into manifold 33, produces the requisite penetration of the material circulating in centrifugal movement to wash the individual grains and remove adhering solution therefrom. Additional steam is introduced through the manifold 32 to heat the circulating material and maintain it in a more fluent condition. Under such conditions, a highly efficient liquids-solids separation is obtained in the centrifugal and the moisture content of the granular product discharge is well below established limits.

However, in the solution removal some of the surface of the grains will be wetted sufficiently to render them somewhat sticky and in their discharge against the outer wall of the discharge compartment they tend to adhere and build up into lumps unless some means is provided to direct their discharge to the outlet end of the compartment. In the earlier observations it was found that such build-up resulted in fine grain formation resulting from the continuing impact on the lumps so formed. Consequently, it was determined that a more positive discharge action would improve the overall action of the centrifugal.

In the practice of the present invention, such build-up is prevented through the provision of a pneumatic cushion or an elastic baffle structure preferably suspended from the top of the housing 12 and extending substantially below the flight path of the granular discharge. Such a baffle structure or cushion provides a pulsing or flexing surface for intercepting the grains in flight and the surface is sufficiently smooth to prevent or lessen adherence of the discharging grains. The baffle structure may be in a variety of shapes and it may be suspended or supported interiorly of the housing in a variety of ways, as shown in the drawings and explained in the preceding description. The provision of a pulsating or flexing surface offsets the sticking tendency of the crystals and directs the discharge to the outlet area without formation of lumps. As a result of such controls, only a nominal amount of fine grains is produced by the discharge action.

Another control innovation of the present invention is the utilization of the annular manifold 56 to assist the granular discharge action. In sugar refining operations, the granular discharge passing from the centrifugal may be introduced into a carrier solution in which it is essentially insoluble permitting its transport without appreciable diminution of grain size, or it may be introduced into a solvent such as water to form an enriched solution which flows readily to a following stage where the sugar is extracted from solution. The valve-controlled supply line 57 feeding manifold 56 may be regulated to supply either type of solution in accordance with the treatment requirement, and also may be selectively operated as a wash spray in cleanup operations.

To provide a more balanced control of such mixing operations, the sugar to water relation is determined by density measurement of the material leaving the centrifugal and the spray at the discharge is used as a means of density control. If the measurement establishes that the water content is too low, or is excessive, the valve in line 57 is actuated to supply more or less liquid to provide the desired balance. In addition to providing a free flowing carrier for the sugar discharge of the centrifugal, the spray discharge from manifold is directed so as to impinge upon the discharging grains to further assist the discharge action and provide a rapid and thorough liquid-to-solids contact which further offsets the tendency toward balling or lump formation and accelerates movement of material to the discharge outlet.

From the foregoing, it will be apparent that the continuous centrifugal separator shown in FIG. 1 provides a rapid and efficient separation of essentially dry sugar grains from associated solution and a controlled discharge of the cleansed sugar grains from the zone of centrifugal separation. Means are provided for directed movement of the granular product through and out of the granular discharge zone, and may include solution introduction for assisting such directed movement and to provide a carrier media for the sugar grains, either as solids with grain size maintained, or as a solvent properly conditioned for extraction of the sugar content at a subsequent treatment stage.

While the operation of the apparatus shown in FIG. 1 has been described as installed in a sugar refining circuit, it will be understood that it will be equally effective in the separation of other granular solids from associated carrier liquid, such as chemical salts in mother liquor, for example. The structural features shown and described represent typical embodiments. Changes and modifications may be availed of within the spirit and scope of this invention as set forth in the hereunto appended claims.

I claim:

1. The method of continuously separating granular crystals from associated solution, which comprises continuously feeding a mixture of granular crystals and associated solution into the bottom portion of a generally-conical, confined zone defined by perforate media in high speed rotation so as to circulate the feed in elevating centrifugal movement, mixing an aqueous solution and steam in an aspirating flow to form a fog containing liquid in atomized condition, discharging said fog in proximity to and directed toward the nearest surface of the perforate media in a plurality of fine feed penetrating streams extending throughout substantially the vertical extent of said media, moving the materials so introduced into the confined zone in an upwardly spiraling course under the impelling influence of the high speed rotation of the media so as to wash adhering solution from the crystals and force separated liquid through the openings in the media until the crystal grains are elevated above an established solution level on the surface of the media, discharging the washed crystal grains so separated from the top of said media in a substantially horizontal flight path, interrupting the horizontal flight of the grains with a suspended elastic surface which pulsates continuously in response to the impingement of discharging crystal grains so as to reduce adhesion of the crystal grains thereby preventing a lump build-up and promote gravitational descent, discharge the separated grains from the treatment at the end of the gravitational descent, and discharging liquid passing the media separately from said grains.

2. The method of continuously separating granular crystals from associated solution, which comprises continuously feeding a mixture of granular crystals and associated solution into the bottom portion of a generally-conical, confined zone defined by perforate media in high speed rotation so as to circulate the feed in elevating centrifugal movement, mixing an aqueous solution and steam in an aspirating flow to form a fog containing liquid in atomized condition, discharging said fog in proximimity to and directed toward the nearest surface of the perforate media in a plurality of fine feed penetrating streams extending throughout substantially the vertical extent of said media, moving the materials so introduced into the confined zone in an upwardly spiraling course under the impelling influence of the high speed rotation of the media so as to wash adhering solution from the crystals and force separated liquid through the openings in the media until the crystal grains are elevated above an established solution level on the surface of the media, discharging the washed crystal grains so separated from the top of said media in a substantially horizontal flight path, interrupting the horizontal flight of the grains with a suspended pulsating surface which pulsates continuously in response to the impingement of discharging crystal grains so as to reduce adhesion of the crystal grains thereby preventing a lump build-up and promote gravitational descent, discharging the separated grains from the treatment at the end of the gravational descent, and discharging liquid passing the media separately from said grains.

3. The method of continuously separating granular crystals from associated solution, which comprises continuously feeding a mixture of granular crystals and associated solution into the bottom portion of a generally-conical, confined zone defined by perforate media in high speed rotation so as to circulate the feed in elevating centrifugal movement, mixing an aqueous solution and steam in an aspirating flow to form a fog containing liquid in atomized condition, discharging said fog in proximity to and directed toward the nearest surface of the perforate mediate in a plurality of fine feed penetrating streams in a sinuous pattern extending throughout substantially the vertical extent of said media, moving the materials so introduced into the confined zone in an upwardly spiraling course under the impelling influence of the high speed rotation of the media so as to wash adhering solution from the crystals and force separated liquid through the openings in the media until the crystal grains are elevated above an established solution level on the surface of the media, discharging the washed crystal grains so separated from the top of media in a substantially horizontal flight path, directing a solvent spray in impinging relation to the horizontal flight of the grains to effect dissolution thereof in the solvent during a descending movement to a point of discharge from the treatment, and discharging the liquid passing the media separately from the dissolved grains.

4. The method of continuously separating granular crystals from associated solution, which comprises continuously feeding and mixture of granular crystals and associated solution into the bottom portion of a generally-conical, confined zone defined by perforate media in high speed rotation so as to circulate the feed in elevating centrifugal movement, mixing an aqueous solution and steam in an aspirating flow to form a fog containing liquid in atomized condition, discharging said fog in proximity to and directed toward the nearest surface of the perforate media in a plurality of fine feed penetrating streams in a sinuous pattern extending throughout substantially the vertical extent of said media, moving the materials so introduced into the confined zone in an upwardly spiraling course under the impelling influence of the high speed rotation of the media so as to wash adhering solution from the crystals and force separated liquid through the openings in the media until the crystal grains are elevated above an established solution level on the surface of the media, discharging the washed crystal grains so separated from the top of said media in a substantially horizontal flight path, directing a liquid spray with which the crystal grains are insoluble in impinging relation to the horizontal flight of the grains to provide a transport carrier and effect a descending movement to a piont of discharge from the treatment, said grains being insoluble in the liquid of the spray, and discharging the liquid passing the media separately from the granular discharge.

5. The method of continuously separating granular crystals from associated solution, which comprises continuously feeding a mixture of granular crystals and associated solution into the bottom portion of a generally-conical, confined zone defined by perforate media in high speed rotation so as to circulate the feed in elevating centrifugal movement, mixing an aqueous solution and steam in an aspirating flow to form a fog containing liquid in atomized condition, discharging said fog in proximity to and directed toward the nearest surface of the perforate media in a plurality of fine feed penetrating streams extending throughout substantially the vertical extent of said media, moving the material so introduced into the confined zone in an upwardly spiraling course under the impelling influence of the high speed rotation of the media so as to wash adhering solution from the crystals and force separated liquid through the openings in the media until the crystal grains are elevated above an established solution level on the surface of the media, discharging the washed crystal grains so separated from the top of said media in a substantially horizontal flight path, directing a liquid spray in impinging relation to the horizontal flight of grains, interrupting the horizontal flight of the grains and associated liquid with a suspended elastic surface which pulsates continuously when contacted by impingement of discharging crystal grains so as to reduce adhesion of the crystal grains thereby preventing a lump build-up and promote gravitational descent, discharging the separated grains from the treatment at the end of the gratitional descent, and discharging liquid passing the media separately from said grains.

6. The method of continuously separating granular crystals from associated solution, which comprises continuously feeding a mixture of granular crystals and associated solution into the bottom portion of a generally-conical, confined zone defined by perforate media in high speed rotation so as to circulate the feed in elevating centrifugal movement, heating the feed in centrifugal movement by introducing steam therein, mixing an aqueous solution and steam in an aspirating flow to form a fog containing liquid in atomized condition, discharging said fog in proximity to and directed toward the nearest surface of the perforate media in a plurality of fine feed penetrating streams extending throughout substantially the vertical extent of said media, moving the materials so introduced into the confined zone in an upwardly spiraling course under the impelling influence of the high speed rotation of the media so as to wash adhering solution from the crystals and force separated liquid through the openings in the media until the crystal grains are elevated above an established solution level on the surface of the media, discharging the washed crystal grains so separated from the top of said media in a substantially horizontal flight path, interrupting the horizontal flight of the grains with a suspended pulsating elastic surface which pulsates continuously in response to the impingement of discharging crystal grains so as to reduce adhesion of the crystal grains thereby preventing a lump build-up and promote gravitational descent, discharging the separated grains from the treatment at the end of the gravitational descent, and discharging liquid passing the media separately from said grains.

7. The method of continuously separating granular crystals from associated solution, which comprises continuously feeding a mixture of granular crystals and associated solution into the bottom portion of a generally-conical, confined zone defined by perforate media in high speed rotation so as to circulate the feed in elevating centrifugal movement, heating the feed in centrifugal movement by introducing steam therein, mixing an aqueous solution and steam in an aspirating flow to form a fog containing liquid in atomized condition, discharging said fog in proximity to and directed toward the nearest surface of the performate media in a plurality of fine feed penetrating streams in a sinuous pattern extending throughout substantially the vertical extent of said media, moving the materials so introduced into the confined zone in an upwardly spiraling course under the impelling influence of the high speed rotation of the media so as to wash adhering solution from the crystals and force separated liquid through the openings in the media until the crystal grains are elevated above an established solution level on the surface of the media, discharging the washed crystal grains so separated from the top of said media in a substantially horizontal flight path, directing a liquid with which the crystal grains are insoluble in impinging relation to the horizontal flight of grains for entraining said grains in a liquid flow to provide a transport carrier therefor, balancing the liquid input to the density of granular discharge flow, discharging the separated granular product from the treatment at the end of the entrained flow, and discharging liquid passing the media separately from said flow.

8. In a continuous centrifugal apparatus, including an enclosed, generally conical, perforate basket mounted for high speed rotation and having a top overflow for granular product, means for feeding material to be treated into the interior of said basket for centrifugal movement by said rotation to direct separated liquid through the openings in the basket and granular material across said overflow, partitioning means within the enclosure for separating the discharge of granular product from the liquid discharge penetrating the openings in the basket, the improvement which comprises a first means having spaced outlets throughout substantially the extent of the basket for introducing steam at spaced intervals into the interior of the basket for heating the material under centrifugal movement, and a second means disposed at about 180° from said first means and having spaced outlets in a sinuous pattern throughout substantially the vertical extent of the basket for directing a plurality of fine streams of an atomized mixture of water in steam in a controlled quantity into the heated material so as to maintain a low moisture content in the granular product discharge, both said means being in proximity to and having said discharge outlets directed towards the nearest surface of the basket.

References Cited by the Examiner

UNITED STATES PATENTS

| 535,306 | 3/1895 | Stewart | 210—211 |
| 1,484,002 | 2/1924 | Avrutik | 210—369 X |
| 1,933,644 | 11/1933 | Trump | 210—78 |
| 2,095,206 | 10/1937 | Sharples | 210—78 |
| 2,223,663 | 12/1940 | Roberts et al. | 127—64 X |
| 2,324,933 | 7/1943 | Jones | 210—369 |
| 2,626,055 | 1/1953 | Hoyt | 210—78 |
| 2,643,960 | 6/1953 | Hoyt | 127—56 |
| 2,883,054 | 4/1959 | Sanchez | 127—19 |
| 2,910,184 | 10/1959 | Strich | 210—371 |
| 2,973,288 | 2/1961 | Riedel | 127—19 |
| 2,984,591 | 5/1961 | Hawksley | 127—56 |
| 3,105,045 | 9/1963 | Borig. | |

FOREIGN PATENTS 1,233,426    5/1960    France.

MORRIS O. WOLK, *Primary Examiner.*